No. 742,984. PATENTED NOV. 3, 1903.
J. W. HAZLEWOOD.
BACK BAND HOOK.
APPLICATION FILED FEB. 27, 1903.
NO MODEL.
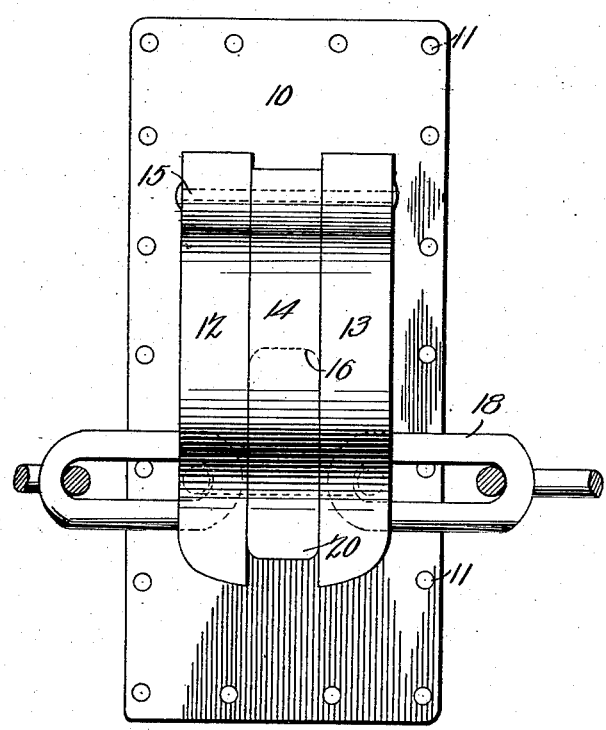
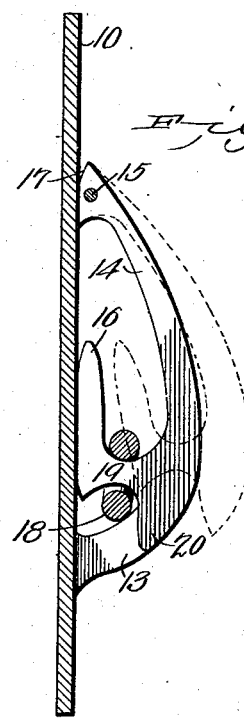
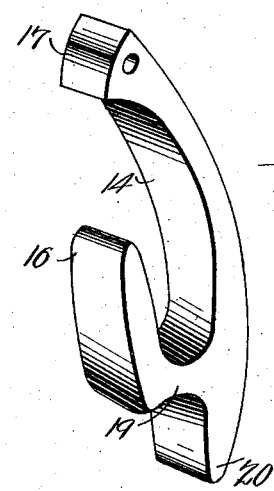
Witnesses
E. F. Stewart
C. N. Woodward
J. W. Hazlewood, Inventor.
by C. A. Snow & Co.
Attorneys No. 742,984.

Patented November 3, 1903.

UNITED STATES PATENT OFFICE.

JOHN WILLIE HAZLEWOOD, OF MARTIN, TENNESSEE.

BACK-BAND HOOK.

SPECIFICATION forming part of Letters Patent No. 742,984, dated November 3, 1903.

Application filed February 27, 1903. Serial No. 145,437. (No model.)

*To all whom it may concern:*

Be it known that I, JOHN WILLIE HAZLEWOOD, a citizen of the United States, residing at Martin, in the county of Weakley and State of Tennessee, have invented a new and useful Back-Band Hook, of which the following is a specification.

This invention relates to attachments for harness whereby the draft chains or traces may be supported adjustably to adapt the harness for hauling different implements and to adapt it to different-sized draft-animals; and the invention consists in certain novel features of construction, as hereinafter shown and described, and specified in the claim.

In the drawings illustrative of the invention, in which corresponding parts are denoted by like designating characters, Figure 1 is a front elevation. Fig. 2 is a vertical sectional elevation. Fig. 3 is a perspective view of the movable combined tongue and hook detached.

This invention will usually be applied to a special form of back-band resting over the back of the draft-animal, but may be applied to the ordinary back-band under some circumstances, and I do not, therefore, wish to be limited in any manner in its location upon the harness or to the uses for which it may be employed and reserve the right to the use of the device for all purposes to which it is adapted.

The improved device will be found especially adapted for regulating the depth of cut of plows and similar implements and consists in a base-plate 10, adapted for connection to the back-band or other support, and to that end is provided with a plurality of spaced apertures 11, through which rivets or other fastening means may pass or by which means the plate may be sewed to the strap forming the back-band. Extending from the plate 10 and preferably integral therewith are spaced bars 12 13, arching outwardly and connected to the plate only at the ends, as shown, thereby leaving relatively large area between the arched bars and the base-plate. Between the bars 12 13 a tongue member 14, conforming in outline to the arched bars, is pivotally supported, conforming in outline to the arched bars and pivotally united by a transverse pin 15, passing through both the bars and tongue at their upper ends, as shown. The tongue member 14 is provided with a hook 16, extending inwardly and upwardly therefrom and arranged to rest against the inner face of the base-plate when the tongue is in its closed position, as shown in full lines in Fig.
2. The portion of the tongue member between its pin 15 and the base 10 is convex, as at 17, and rests constantly against the base 10, the curve of the convex portion permitting a sufficient "play" of the tongue to permit it to be opened into the position shown by dotted lines in Fig. 2, but preventing its being moved outwardly sufficient to carry the hook beyond the arched bars.

The tongue will move a sufficient distance to permit a link of the draft-chain, as shown at 18, to be engaged with the hook, and then when the hook returns to its inward position the chain will be held in operative position and cannot be detached, no matter how violently the device may be shaken about.

The hook member 16 is located above the lower end of the tongue member 14 and extends inwardly for a short distance and is provided with a "horn" 19, depending below its lower portion, the horn coacting with the lower end 20 of the tongue to form lateral supports for the chain-links and effectually prevent lateral movement thereof relative to the hook and any possible displacement of the chain while in operation. It will be obvious by this arrangement that the chain may be very quickly and easily adjusted longitudinally to regulate the length and likewise to regulate the draft or depth of cut when employed in connection with plows and similar implements.

The device will preferably be of malleable iron and of any suitable size or strength to withstand the severe strains to which it will be subjected.

Having thus described my invention, what I claim is—

An attachment for harness, consisting of a base-plate having outwardly-arching spaced bars united at their ends to the plate, and a tongue movably connected by its upper end to hang by gravity between said arched bars, and provided with a hook extending inwardly therefrom and formed with a downwardly-extending lug at its extremity to serve as a stop to prevent displacement of the chain, substantially as described.

In testimony that I claim the foregoing as my own I have hereto affixed my signature in the presence of two witnesses.

JOHN WILLIE HAZLEWOOD.

Witnesses:
W. W. BOWMAN,
H. D. SANDERS.